US012737293B2

(12) United States Patent
Wang et al.

(10) Patent No.: US 12,737,293 B2
(45) Date of Patent: Sep. 15, 2026

(54) METHOD AND DEVICE FOR CACHING MESSAGE, ELECTRONIC EQUIPMENT AND STORAGE MEDIUM

(71) Applicant: SANECHIPS TECHNOLOGY CO., LTD., Shenzhen (CN)

(72) Inventors: Min Wang, Shenzhen (CN); Jinlin Xu, Shenzhen (CN); Yue Wang, Shenzhen (CN); Zihan Tang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/000,081

(22) Filed: Dec. 23, 2024

(65) Prior Publication Data

US 2025/0130940 A1 Apr. 24, 2025

Related U.S. Application Data

(63) Continuation of application No. PCT/CN2023/087615, filed on Apr. 11, 2023.

(30) Foreign Application Priority Data

Jun. 27, 2022 (CN) ......................... 202210745290.7

(51) Int. Cl.
*G06F 12/00* (2006.01)
*G06F 12/0802* (2016.01)

(52) U.S. Cl.
CPC ................................ *G06F 12/0802* (2013.01)

(58) Field of Classification Search
CPC ................................................... G06F 12/0812
See application file for complete search history.

(56) References Cited

U.S. PATENT DOCUMENTS 6,295,068 B1 * 9/2001 Peddada ................... G06T 1/60
345/582
7,088,872 B1 * 8/2006 Hsieh ...................... G06F 17/18
382/168

(Continued)

FOREIGN PATENT DOCUMENTS

CN 101094183 A 12/2007
CN 101784994 A 7/2010

(Continued)

OTHER PUBLICATIONS

European Patent Office. Extended European Search Report for EP Application No. 23829604.0, mailed Jul. 18, 2025, pp. 1-8.

(Continued)

*Primary Examiner* — Craig S Goldschmidt
(74) *Attorney, Agent, or Firm* — Vivacqua Crane, PLLC

(57) ABSTRACT

Embodiments of the present application relate to the technical field of network communication, and disclose a method and a device for caching a message, an electronic equipment and a storage medium. The method for caching the message includes: dividing a cache space into an N*N cache array, N being a natural number greater than zero, and each cache block in the cache array being in a same size; selecting a cache block for storing the message according to a size of the message to be stored and a number of free addresses of each cache block; and storing the message in a free address of a selected cache block.

13 Claims, 6 Drawing Sheets

(56) References Cited

U.S. PATENT DOCUMENTS

| | | | | |
|---|---|---|---|---|
| 7,930,481 | B1 | 4/2011 | Nagler et al. | |
| 2009/0049248 | A1 | 2/2009 | Clark et al. | |
| 2015/0324294 | A1* | 11/2015 | Ogawa | G06F 12/0871 711/118 |
| 2018/0060145 | A1* | 3/2018 | Jaiswal | G06F 9/546 |

FOREIGN PATENT DOCUMENTS

| | | | |
|---|---|---|---|
| CN | 103150122 | A | 6/2013 |
| CN | 103595653 | A | 2/2014 |

OTHER PUBLICATIONS

International Search Report and Written Opinion issued in PCT/CN2023/087615, mailed Aug. 24, 2023; 10 pgs.

* cited by examiner bank0 bank1 bank2 bank3 group0 group1 group2 group3

METHOD AND DEVICE FOR CACHING MESSAGE, ELECTRONIC EQUIPMENT AND STORAGE MEDIUM

CROSS-REFERENCE TO RELATED APPLICATIONS

This application is a continuation application of International Application No. PCT/CN2023/087615, filed on Apr. 11, 2023, which claims priority to Chinese patent application No. 202210745290.7, and filed on Jun. 27, 2022, the entire contents of which are incorporated herein by reference.

TECHNICAL FIELD

Embodiments of the present application relate to the technical field of network communication, and in particular to a method and a device for caching a message, an electronic equipment and a storage medium.

BACKGROUND

In the process of traffic management of the network processor, when storing on-chip messages, the storage method usually adopted is the whole packet cache method. The message in any size will be stored in the cache space.

However, in the whole packet cache method, the storage space of the largest message needs be met. For the storage of small packet messages, defects such as insufficient use of cache space and waste of a large amount of storage resources will occur.

SUMMARY

An embodiment of the present application provides a method for caching the message including: dividing a cache space into an N*N cache array, N being a natural number greater than zero, and each cache block in the cache array being in a same size; selecting a cache block for storing the message according to a size of the message to be stored and a number of free addresses of each cache block; and storing the message in a free address of a selected cache block.

An embodiment of the present application further provides a device for caching a message, which includes: a division module, configured to divide a cache space into an N*N cache array, N being a natural number greater than zero, and each cache block in the cache array being in a same size; a selection module, configured to select a cache block for storing the message according to a size of the message to be stored and a number of free addresses of each cache block; and a storage module, configured to store the message in a free address of a selected cache block.

An embodiment of the present application further provides a device for caching a message, which includes: at least one processor and a memory communicating with the at least one processor. The memory stores an instruction executable by the at least one processor, and the instruction is executed by the at least one processor to make the at least one processor execute the method for caching the message as mentioned above.

An embodiment of the present application further provides a device for caching a message, which stores a computer program. When the computer program is executed by a processor, the method for caching the message as mentioned above is implemented.

In the method for caching a message of the present application, the cache space is divided into an N*N cache array. N is a natural number greater than zero, and the size of each cache block in the cache array is the same. According to the size of the message to be stored and the number of free addresses of each cache block, a cache block for storing the message is selected, and the message is stored in the free address of the selected cache block. By dividing the cache space into an N*N cache array, since the size of each cache block in the cache array is the same, the cache block for storing the message can be determined according to the size of the message to be stored and the number of free addresses in each cache block, and the message is stored in the free address of the selected cache block, so that the resources of each cache block are fully utilized, avoiding that the resources in the cache space is wasted due to the small packet storage of the message while other cache blocks still have more storage space. That is, the utilization and balance of the cache space can be effectively improved, and the waste of storage resources can be reduced.

BRIEF DESCRIPTION OF THE DRAWINGS

One or more embodiments are exemplified by the figures in the corresponding drawings, and these illustrative descriptions do not constitute a limitation to the embodiments. Elements with same reference numbers in the drawings represent similar elements, and unless otherwise stated, the figures in the drawings do not constitute proportional limitations.

DETAILED DESCRIPTION OF THE EMBODIMENTS

In order to make the purpose, technical solutions and advantages of the present application clearer, embodiments of the present application will be clearly described below in conjunction with the drawings of the present application. However, those skilled in the art can understand that, in the various embodiments of the present application, many technical details are provided in order to enable the reader to better understand the present application. Even without these technical details and various changes and modifications based on following embodiments, the technical solutions in the present application can still be implemented. The division of following embodiments is for the convenience of description and should not constitute any limitation on the specific implementation of the present application. The various embodiments can be combined and referenced with each other under the premise of no contradiction.

An embodiment of the present application relates to a method for caching a message, by dividing the cache space into an N*N cache array, since the size of each cache block in the cache array is the same, the cache block for storing the message can be determined according to the size of the message to be stored and the number of free addresses in each cache block, and the message is stored in the free address of the selected cache block, so that the resources of each cache block are fully utilized, avoiding that resources in the cache space is wasted due to the storage of small packet messages while other cache blocks still have more storage space.

The method for caching the message of this embodiment can be applied to the traffic management in the chip design of the network processor in the technology field of network communication, to realize cache management of the message to be stored.

Figures 1, 2:
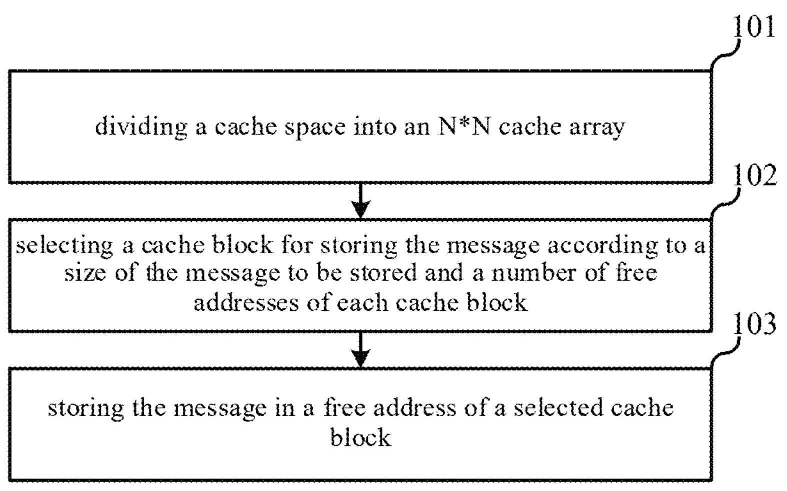
FIG. 1 is a flowchart of a method for caching a message according to an embodiment of the present application.
FIG. 2 is a schematic structural diagram of a cache array according to an embodiment of the present application.

The specific implementation flowchart of the method for caching the message of this embodiment is shown in FIG. 1, which includes following steps.

Step 101, dividing a cache space into an N*N cache array. N is a natural number greater than zero, and each cache block in the cache array has a same size.

Step 102, selecting a cache block for storing the message according to a size of the message to be stored and a number of free addresses of each cache block.

Step 103, storing the message in a free address of a selected cache block.

The following is a specific description of the implementation details of the method for caching the message in this embodiment. The following contents are only for the convenience of understanding the implementation details, and are not necessary for the implementation of this solution.

In step 101, the cache space on the chip is divided into a plurality of cache blocks in the same size, and then the plurality of cache blocks are combined into an N*N cache array.

Each cache block is the minimum management granularity of the cache space, namely 192 bytes (B). Since the size of each cache block is the same, the number of dividing the cache space in the present embodiment can be effectively reduced, that is, the cache block only needs to be divided once, thereby reducing the area and power consumption of the system.

In an embodiment, the cache array of the present embodiment can be shown in FIG. 2. N is equal to 4, group represents the row of the cache array, and bank represents the column of the cache array. The bank 0, bank 1, bank 2, and bank 3 respectively represent each cache block in one group. The parameters of the cache block are 4K (depth) *192B (bit width), and the value of the parameter can be determined by factors, such as the amount of data, the bit width of the message bus, and the number of read-write access ports.

The cache array in FIG. 2 is only a schematic diagram of the method for caching the message of the present embodiment. The size of the cache array can further be 8*8, and the parameter of the cache block is 1K*96B. Those skilled in the art can select the corresponding cache array according to the layout and wiring inside the chip.

For ease of understanding, an example is given to illustrate how to determine the parameters of the cache block.

In a case, the cache space needs to support the storage of 64K messages, and each message data bus is within 768 B, and has three access ports, namely two reading access ports and one writing access port.

If the cache block in this embodiment is a single-port random access memory (RAM), in order to support the above-mentioned case of two reading access ports and one writing access port, at least three cache blocks are used to allocate different cache units to avoid read-write conflicts, so that the size of the cache array is at least 3*3. If a cache block with a depth of 4K is used, in order to support the storage of 64K messages, the number of storage blocks is 16, and the size of the cache array can be 4*4, that is, there are 4 groups*4 banks. If a cache block with a depth of 1K is used, in order to support the storage of 64K messages, the number of storage blocks is 64, and the size of the cache array can be 8*8, that is, there are 8 groups*8 banks.

In an embodiment, a dual-port RAM can further be used in the cache block to realize simultaneous reading and writing of data and meet the requirement that the integrated circuit needs to have a higher cache efficiency during the application process.

In step 102, since each cache block in the cache array has different number of free addresses, the number of free addresses of the cache block storing the message needs to meet the size of the message. Therefore, it is necessary to select the cache block for storing the message according to the size of the message to be stored and the number of free addresses of each cache block, so as to make full use of the cache space on the chip and improve the utilization rate of the cache space.

In an embodiment, according to the size of the message to be stored, the number L of cache blocks required to store the message is determined, and L is a natural number greater than zero. For example, for a large packet message with 768 B, 4 cache blocks can be provided when the full bandwidth is reached to realize the simultaneous storage and reading of 768 B data. For a small packet message, 1 to 3 cache blocks are provided. Then, L rows of cache blocks are determined in the cache array as candidate cache rows. In each candidate cache row, one cache block is selected as a target cache block according to the ranking result of the number of free addresses of each cache block. In an embodiment, the cache block with the largest number of free addresses is selected as the target cache block.

In an embodiment, after determining the number L of cache blocks required to store the message, a candidate cache row is first determined in the cache array. In an embodiment, the number of free addresses of each row of cache blocks in the cache array is ranked, and L rows of cache blocks in the cache array are determined as candidate cache rows according to the ranking result of the number of free addresses of each row of cache blocks. That is, the number of free addresses of each row of cache blocks is ranked from large to small, and L rows of cache blocks are selected in turn as candidate cache rows, to ensure that the number of free addresses of the selected candidate cache row is the largest, thereby meeting the size of the message to be stored.

As shown in FIG. 2, if the size of the message to be stored requires the number L of cache blocks is 3, the sum of the number of free addresses of each cache block in group 0 will be determined, and the sum of the number of free addresses of each cache block in group1, group2, and group3 will be determined in the same way. The determined numbers of free addresses of the four groups will then be ranked, and the group with the most, second most, and third most free addresses is selected in turn as the candidate cache row. In a case that the candidate cache rows are group0, group1, and group2, the number of free addresses of each cache block in group0 is ranked to select the cache block with the most free addresses from group0, and the number of free addresses of each cache block in group1, group2 will be ranked in the same way. The selected three cache blocks are used as the target cache blocks for storing the message.

In an embodiment, the ranking result of the number of free addresses of cache blocks in each row of the cache array and the ranking result of the number of free addresses of cache blocks in the candidate cache row are obtained based on a comparison algorithm, to ensure the balance of messages stored in the cache blocks in the rows and columns of the cache array.

In an embodiment, a counter is pre-set in each cache block of the cache array. The counters of the cache blocks in each row are named data_cnt0 to data_cnt3, and the numerical orders are from small to large. That is, after the number L of cache blocks required to store the message is determined, each data_cnt value is compared with the other three data_cnt values in turn. After comparison, the weight of the larger data_cnt value is recorded as 1, and the weight of the smaller data_cnt value is recorded as 0. If the two data_cnt values are the same, the weight of the data_cnt value with a smaller numerical order is recorded as 1, and the weight of the data_cnt value with a larger numerical order is recorded as 0. The weights of these data_cnt values are the ranking result. The one ranked first indicates that the cache block in this row has the most free addresses, and the same rule applies along the numerical orders. The ranking method of the number of free addresses of the cache blocks in each column is the same as the ranking method of the number of free addresses of the cache blocks in each row, which will not be repeated here.

In step 103, after selecting the target cache block for storing the message, the message is stored in the free address of the target cache block, that is, the message is queued.

Those skilled in the art can understand that the storage of the message is dynamic. While there are messages entering the queue, there are also messages being dequeued. Therefore, in this embodiment, according to the size of the message to be stored and the number of free addresses of each cache block, the selected cache block for storing the message can be fully stored in a case.

Figure 3:
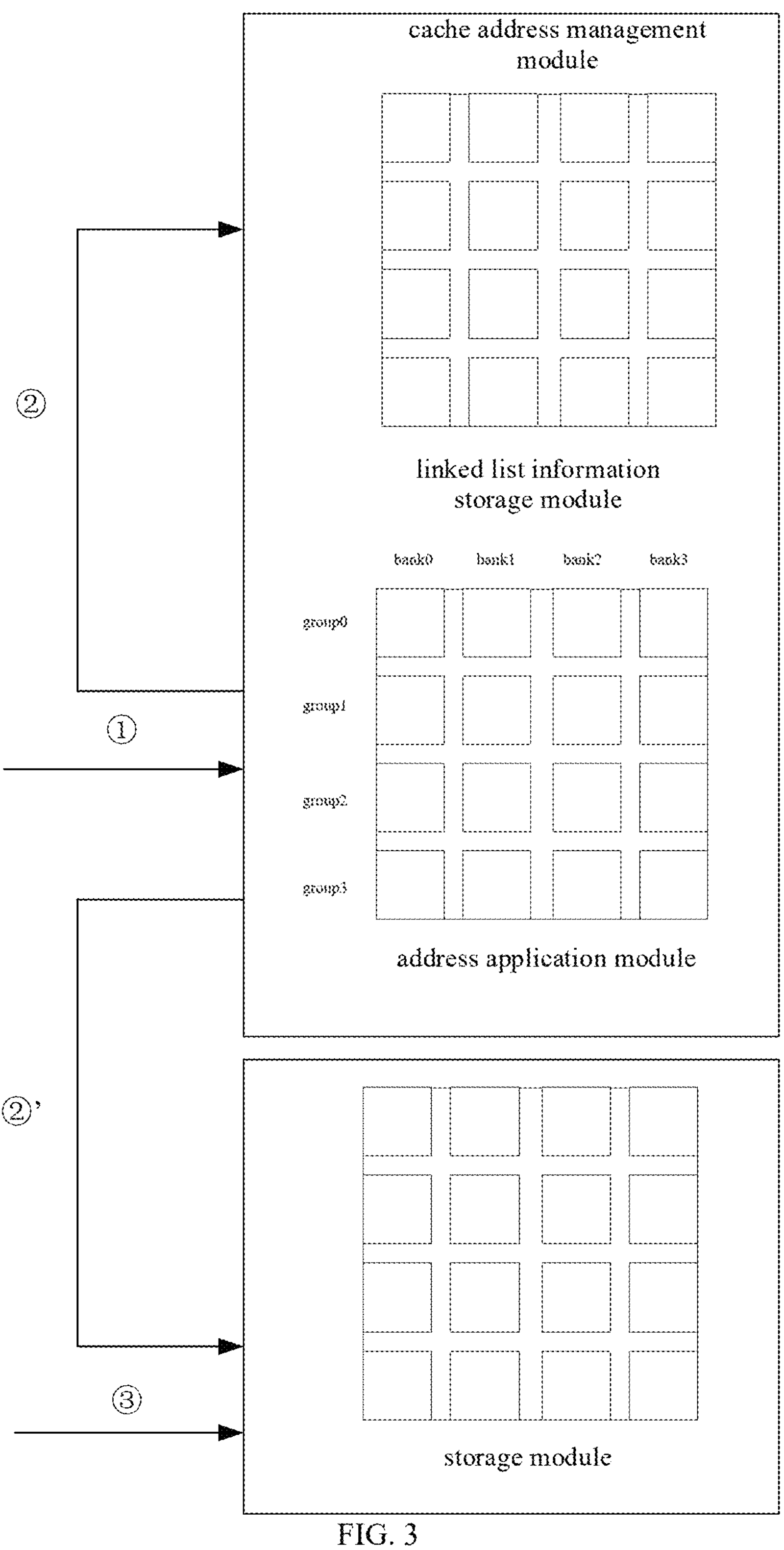
FIG. 3 is a schematic diagram showing the enqueued step of a message according to an embodiment of the present application.

In an embodiment, the method for caching the message can be applied to the architecture shown in FIG. 3, which includes a cache address management module and a storage module. The cache address management module further includes a linked list information storage module and an address application module. The structures of the storage module, the linked list information storage module and the address application module are all cache arrays in the same size.

In an embodiment, the address application module is configured to receive a storage request for a message, namely, an address application request, and configured to allocate cache blocks for storing the message. The storage module is configured to store the message in a free address of the cache block for storing the message. The linked list information storage module is configured to store the address information of the cache block for storing the message.

FIG. 3 is a schematic diagram showing the enqueued step of a message. ① represents an address application request. ② represents that the address information of the cache block for storing the message applied from the address application module is stored to the linked list information storage module. ②' represents that the applied address of the cache block is sent to the storage module. ③ represents that the message is stored to the applied free address of the cache block, thereby completing the enqueued step.

In an embodiment, after a cache block for storing a message is selected, since one to four cache blocks may be used to store a message, the message in this embodiment is stored in a free address of the selected cache block, and in the cache block for storing the message, the addresses of other cache blocks except the first cache block are written into the first cache block. The first cache block is configured as the target cache block selected from the first candidate cache row, that is, the first cache block is the target cache block with the largest number of free addresses in the candidate cache row with the largest number of free addresses. The address of the cache block is configured to indicate the storage location of the message. By writing the addresses of cache blocks except the first cache block into the first cache block, when the message is dequeued, only the address of the first cache block for storing the message needs to be obtained, and the addresses of other cache blocks except the first cache block can be obtained from the first cache block, that is, the address for storing all cache blocks is obtained, making queue management simpler.

Figure 4:
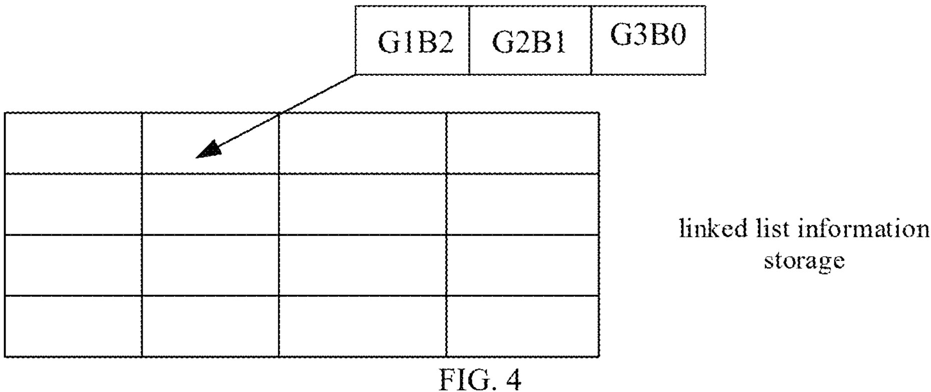
FIG. 4 is a schematic diagram of the linked list information storage according to an embodiment of the present application.

As shown in FIG. 4, if the cache blocks for storing the message are G0B1 (i.e., bank1 of group0), G1B2, G2B1, and G3B0 in the figure, G0B1 in the cache array of the linked list information storage module corresponding to the address application module is used as the address; G1B2, G2B1, and G3B0 are spliced as data, and the spliced data is written into G0B1. That is, the address information of the cache block for storing the message requested from the address application module is stored in the linked list information storage module. Therefore, when performing the dequeued step on the message, the address of the first cache block for storing the message can be directly obtained from the linked list information storage module, and the addresses of other cache blocks except the first cache block can be obtained from the first cache block. According to the addresses of each cache blocks for storing the message, the stored message is obtained from the cache blocks in the cache array corresponding to the storage module.

In an embodiment, since the enqueued step of a message and the linked list storage are performed simultaneously, the step of queuing application will not be delayed, and the overall rate of the system will not be reduced.

In this embodiment, the cache space is divided into an N*N cache array. N is a natural number greater than zero, and the size of each cache block in the cache array is the same. According to the size of the message to be stored and the number of free addresses of each cache block, a cache block for storing the message is selected, and the message is stored in the free address of the selected cache block. By dividing the cache space into an N*N cache array, since the size of each cache block in the cache array is the same, the cache block for storing the message can be determined according to the size of the message to be stored and the number of free addresses in each cache block, and the message is stored in the free address of the selected cache block, so that the resources of each cache block are fully utilized, avoiding that the resources in the cache space is wasted due to the small packet storage of the message while other cache blocks still have more storage space. That is, the utilization and balance of the cache space can be effectively improved, and the waste of storage resources can be reduced.

Figure 5:
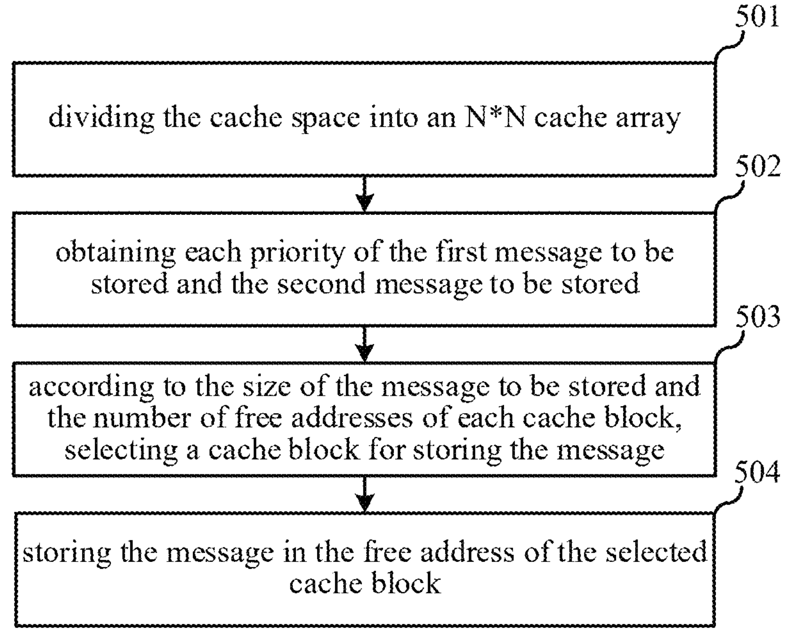
FIG. 5 is another flowchart of the method for caching the message according to an embodiment of the present application.

Another embodiment of the present application relates to a method for caching the message. This embodiment is roughly the same as the first embodiment, except that the type of the cache block in this embodiment is single-port RAM. Therefore, when the message to be stored includes a first message and a second message, a storage conflict will occur. This embodiment provides a conflict avoidance mechanism during address application, to solve the storage conflict problem. The specific implementation flowchart of the method for caching the message in this embodiment is shown in FIG. 5, which includes following steps.

Step 501, dividing the cache space into an N*N cache array. N is a natural number greater than zero. The size of each cache block in the cache array is the same, and the type of the cache block is single-port RAM.

Step 502, obtaining each priority of the first message to be stored and the second message to be stored.

The first message is an on-chip message, and the second message is an off-chip message. Since the access cycle of the off-chip message is long when the off-chip message is stored, a pre-read step is generally required when the message is dequeued, and the off-chip message needs to be written back to the cache space first. Therefore, there may be a case that the message to be stored includes the first message and the second message.

In an embodiment, the type of the cache block in this embodiment is a single-port RAM, which does not support two-read scenarios. Therefore, when the message to be stored includes the first message and the second message, it is first necessary to obtain each priority of the first message and the second message. The priority of the message is determined in advance according to the needs of the business.

Step 503, according to the size of the message to be stored and the number of free addresses of each cache block, selecting a cache block for storing the message.

In an embodiment, in order to avoid conflicts when storing the first message and the second message, the cache blocks applied for the first message and the second message should be completely different. Therefore, when selecting a candidate cache row for storing the message from the cache array, it is necessary to determine the candidate cache rows of the first message and the second message from the cache array according to each priority of the first message and the second message. There may be a plurality of candidate cache rows for each message, and they are selected for a plurality of times. For determining each candidate cache row, when the priority of the first message is higher than that of the second message, a row of cache blocks with the largest number of free addresses is selected from the cache array as the candidate cache row for the first message, and a row of cache blocks with the second largest number of free addresses is selected from the cache array as the candidate cache row for the second message.

After selecting the candidate cache rows of the first message and the second message, the first message and the second message may select the same candidate cache row. In this case, for the same candidate cache row selected by the first message and the second message, according to the ranking result of the number of free addresses of each cache block in the candidate cache row, the cache block with the largest number of free addresses is selected as the cache block for storing the first message, and a cache block with the second largest number of free addresses is selected as a cache block for storing the second message. If the candidate cache row of the first message is different from the candidate cache row of the second message, among different candidate cache rows, for the candidate cache row of the first message, the cache block with the largest number of free addresses is selected as the cache block for storing the first message, and for the candidate cache row of the second message, the cache block with the largest number of free addresses is selected as the cache block for storing the second message.

As shown in FIG. 2, if the number L of candidate cache rows required for the first message is 3, and the number L of candidate cache rows required for the second message is 1, while determining the first candidate cache row of the first message, it is necessary to determine the candidate cache row of the second message. In this case, group0 has the largest number of free addresses, group1 has the second largest number of free addresses, and group2 has the third largest number of free addresses. Then group0 is used as the candidate cache row of the first message, and group1 is used as the candidate cache row of the second message. Then, the second and third candidate cache rows of the first message, namely group1 and group2, are determined in turn. If group1 is the same candidate cache row selected for the first message and the second message, then in group1, the cache block with the largest number of free addresses, such as bank0, is selected as the cache block for storing the first message. The cache block with the second largest number of free addresses, such as bank1, is selected as the cache block for storing the second message.

The above is only an example of selecting a cache block for storing a message on a basis that the priority of the first message is higher than the priority of the second message, but the implementation of the present application is not limited to this, that is, the priority of the second message may also be higher than the priority of the first message.

Step 504, storing the message in the free address of the selected cache block.

Step 504 is roughly the same as step 103 and will not be repeated here.

In the embodiment, since the messages to be stored may include a first message and a second message, it is necessary to meet the requirement of storing the first message and the second message. When the type of the cache block is a single-port RAM, there is a storage conflict problem. After the cache space is divided into an N*N cache array, the priorities of the first message and the second message to be stored are obtained, and it is determined whether the candidate cache row of the first message is the same as the candidate cache row of the second message. When the candidate cache row of the first message is the same as the candidate cache row of the second message and the priority of the first message is higher than the priority of the second message, in each candidate cache row, the cache block with the largest number of free addresses is selected as a cache block for storing a first message, and a cache block with the second largest number of free addresses is selected as a cache block for storing a second message, which can effectively solve the storage conflict problem caused by port restrictions.

Figure 6:
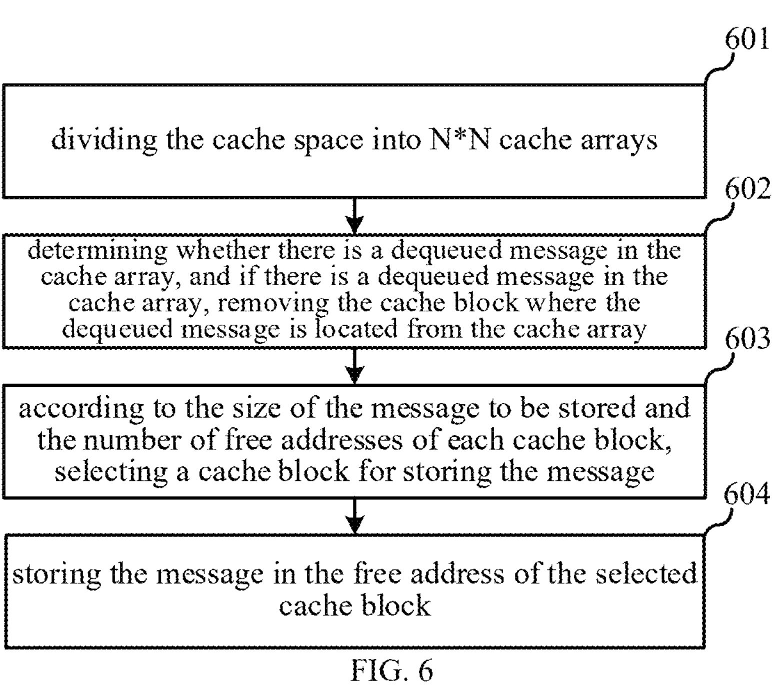
FIG. 6 is yet another flowchart of the method for caching the message according to an embodiment of the present application.

Another embodiment of the present application relates to a method for caching the message, which is roughly the same as the first embodiment, except that the type of the cache block in this embodiment is a single-port RAM. Therefore, when there is a dequeued message in the cache array, a read-write conflict will occur. This embodiment provides a read-write conflict avoidance mechanism to solve the read-write conflict problem. The specific implementation flowchart of the method for caching the message in this embodiment is shown in FIG. 6, which includes following steps.

Step 601, dividing the cache space into N*N cache arrays. N is a natural number greater than zero, the size of each cache block in the cache array is the same, and the type of the cache block is single-port RAM.

Step 602, determining whether there is a dequeued message in the cache array, and if there is a dequeued message in the cache array, removing the cache block where the dequeued message is located from the cache array.

In an embodiment, since the dequeued message is unpredictable, the dequeued address recovery has a higher priority than the enqueued address application. Therefore, when there is a dequeued message in the cache array, that is, when the cache block address needs to be recovered, the cache block where the dequeued message is located is removed from the cache array.

Figure 7:
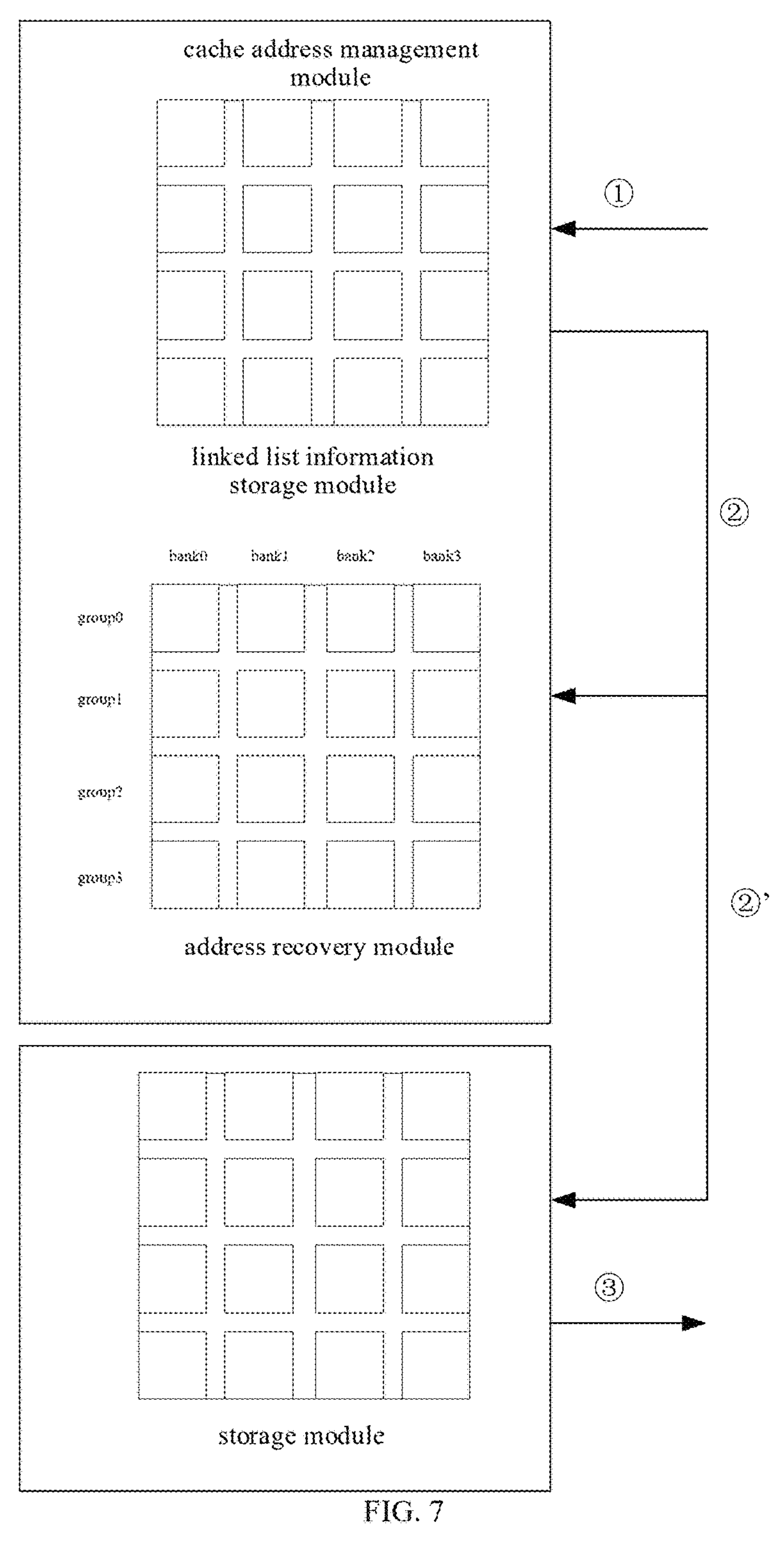
FIG. 7 is a schematic diagram showing the dequeued step of a message according to an embodiment of the present application.

FIG. 7 is a schematic diagram showing the dequeued step of a message. That is, when there is a dequeued message in the cache array, if the addresses of the dequeued message are G0B1 and G1B0, G0B1 and G1B0 need to be recovered and removed from the cache array.

Step 603, according to the size of the message to be stored and the number of free addresses of each cache block, selecting a cache block for storing the message.

Specifically, according to the size of the message to be stored and the number of free addresses of each cache block, selecting a cache block for storing the message from the cache array after the cache block is removed. For example, if the removed cache blocks are G0B1 and G1B0 in the cache array, selecting a cache block for storing the message from other cache blocks except the cache blocks that have removed G0B1 and G1B0. The specific method of selecting the cache block for storing the message is the same as that of the first embodiment, which will not be repeated here.

Step 604, storing the message in the free address of the selected cache block.

Step 604 is roughly the same as step 103 and will not be repeated here.

In an embodiment, the dequeued step of the message in this embodiment can be implemented by the structure shown in FIG. 7, and the structure includes a cache address management module and a storage module. The cache address management module further includes a linked list information storage module and an address recovery module. The structures of the storage module, the linked list information storage module and the address recovery module are all cache arrays in the same size.

In an embodiment, the address recovery module is configured to receive a dequeued request for the message, that is, an address recovery request. The storage module is configured to store the dequeued message. The linked list information storage module is configured to store the address information of the cache block for storing the dequeued message.

As shown in FIG. 7, ① represents an address recovery request, ② represents the addresses of each cache block storing the message obtained from the linked list information storage module, ②' represents that the obtained cache block address is sent to the storage module, ③ represents the message is read from the corresponding cache block of the storage module, thereby completing the dequeued step of the message.

In an embodiment, since the dequeued step and the address recovery step of the message are performed simultaneously, the dequeued application step will not be delayed, and the overall rate of the system will not be reduced.

In this embodiment, since there will be scenarios where messages are queued and messages are dequeued, when the type of the cache block is single-port RAM, there will be a read-write conflict, that is, the conflict problem of message queued step and message dequeued step. After the cache space is divided into the N*N cache array, when there are dequeued messages in the cache array, the cache block where the dequeued message is located is removed from the cache array. According to the size of the message to be stored and the number of free addresses of each cache block, a cache block for storing the message is selected from the cache array after the cache block is removed, so that the read-write conflict problem caused by port restrictions can be effectively solved.

The second and third embodiments of the present application are only two scenarios that may occur when caching two messages: two reading access ports, one reading access port and one writing access port. There may also be various conflicting scenarios such as two reading access ports and one writing access port, two reading access ports and two writing access ports, and the like, so that the method for caching the message of the second embodiment can be combined with the method for caching the message of the third embodiment to solve the above-mentioned conflict problem.

In an embodiment, if the size of the cache array is 4*4, the conflict scenario of two reading access ports and two writing access ports can be solved at most. If cases of the read-write sources are more than that of two reading access ports and two writing access ports, it can be solved by increasing the number of arrays and adjusting the depth of the cache block. For example, the 8*8 cache array can be used to solve the conflict scenario of four reading access ports and four writing access ports at most.

In an embodiment, if there is a conflict scenario of two reading access ports and one writing access port, that is, the message is dequeued, the on-chip message is queued, and the off-chip message is queued at the same time, the cache block address that can be applied according to the conflict avoidance mechanism in the method for caching the message of the present application embodiment is shown in Table 1.

TABLE 1

| | ranks of free addresses of cache blocks | | | | | | | |
|---|---|---|---|---|---|---|---|---|
| message is dequeued | bank0 | | bank1 | | bank2 | | bank3 | |
| on-chip message is queued | N | bank1 | N | bank0 | N | bank0 | N | bank0 |
| off-chip message is queued | bank1 | bank2 | bank0 | bank2 | bank0 | bank1 | bank0 | bank1 |

The bank0 to bank3 represent cache blocks, and bank0 to bank3 represent the ranks of free addresses in the bank, which is ranked from most to least. Address recovery may be any bank from 0 to 3. There are two situations for on-chip message queued application, namely bank0 and bank1. N means that there is no message queue request on the chip, and the priority of off-chip message queued application is the lowest, which is bank0, bank1 or bank2.

For ease of understanding, the above table is illustrated below. When there is a message dequeued in bank0, bank0 is removed from the cache array, then bank1 is the bank with the most free addresses. If there is no message enqueued request on the chip in this case, that is, N, then the off-chip message enqueued request can apply for bank1 with the most free addresses. If there is a message enqueued request on the chip in this case, and the priority of the on-chip message is greater than the priority of the off-chip message, then the on-chip message will apply for bank1 with the most free addresses, and the off-chip message can apply for bank2 with the second most free addresses. When the message is dequeued on bank1 to bank3, the on-chip message and the off-chip message apply for each cache block in a similar way, which will not be repeated.

It should be noted that the above embodiments are all examples for easy understanding and do not limit the technical solutions of the present application.

The steps of the above methods are divided only for clearly describing. When implementing, they can be combined into one step or some steps can be split and divided into a plurality of steps. As long as they include the same logical relationship, they are all fall within the scope of the present application. Adding insignificant modifications or introducing insignificant designs to the algorithm or process, but not changing the core design of its algorithm and process, are all fall within the scope of the present application.

Figure 8:
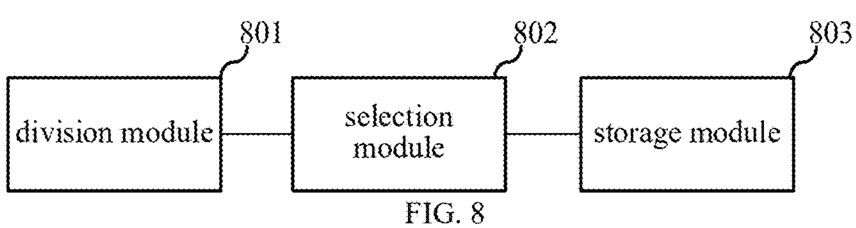
FIG. 8 is a schematic diagram of a device according to another embodiment of the present application.

Another embodiment of the present application relates to a device for caching the message. The details of the device for caching the message of this embodiment are specifically described below. The following contents are only for the convenience of understanding the implementation details, and are not necessary for implementing this embodiment. FIG. 8 is a schematic diagram of the device for caching the message according to this embodiment, which includes a division module 801, a selection module 802, and a storage module 803.

In an embodiment, the division module 801 is configured to divide the cache space into an N*N cache array. N is a natural number greater than zero, and the size of each cache block in the cache array is the same.

The selection module 802 is configured to select a cache block for storing a message according to the size of the message to be stored and the number of free addresses of each cache block.

In an embodiment, the selection module 802 is further configured to determine the number L of cache blocks required to store the message according to the size of the message to be stored, and determine L rows of cache blocks in the cache array as candidate cache rows. In addition, the selection module 802 is further configured to, in each candidate cache row, select a cache block as a target cache block according to the ranking result of the number of free addresses of each cache block.

In an embodiment, the selection module 802 is further configured to rank the number of free addresses of each row of cache blocks in the cache array, determine L rows of cache blocks in the cache array as candidate cache rows according to the ranking result of the number of free addresses of each row of cache blocks.

In an embodiment, when the type of the cache block is a single-port RAM and the messages to be stored include a first message and a second message, the selection module 802 is further configured to determine whether the candidate cache row of the first message is the same as the candidate cache row of the second message. When the candidate cache row of the first message is the same as the candidate cache row of the second message and the priority of the first message is higher than the priority of the second message, in each candidate cache row, the cache block with the largest number of free addresses is selected as the cache block for storing the first message, and the cache block with the second largest number of free addresses is selected as the cache block for storing the second message.

In an embodiment, when the type of the cache block is a single-port RAM and after the cache block where the dequeued message is located is removed from the cache array, the selection module 802 is further configured to select a cache block for storing the message from the cache array after the cache block is removed according to the size of the message to be stored and the number of free addresses of each cache block.

The storage module 803 is configured to store the message in the free address of the selected cache block.

In an embodiment, the storage module 803 is further configured to store the message in the free address of the selected target cache block.

This embodiment is a device embodiment corresponding to the above method embodiments, and this embodiment can be implemented in conjunction with the above method embodiments. The relevant technical details and technical effects mentioned in the above embodiments are still valid in this embodiment. In order to reduce repetition, they are not repeated here. Accordingly, the relevant technical details mentioned in this embodiment can also be applied in the above embodiments.

All modules involved in this embodiment are logical modules. In practical applications, a logical unit can be a physical unit, or a part of a physical unit, and can further be implemented in a combination of a plurality of physical units. In addition, in order to stress the innovative part of the present application, this embodiment does not introduce units that are not closely related to solving the technical problems proposed by the present application, but this does not mean that there are no other units in this embodiment.

Figure 9:
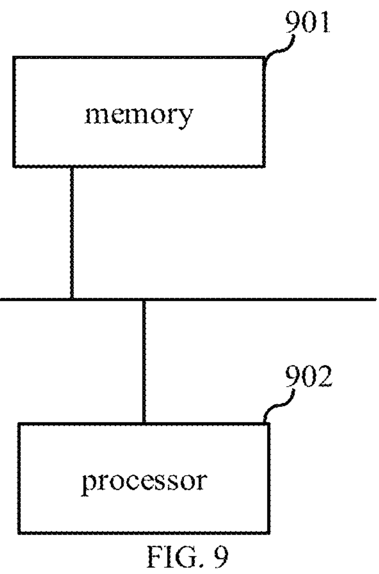
FIG. 9 is a schematic structural diagram of an electronic equipment according to another embodiment of the present application.

Another embodiment of the present application relates to an electronic equipment, as shown in FIG. 9, which includes at least one processor 901, and a memory 902 communicating with the at least one processor 901. The memory 902 stores instructions that can be executed by the at least one processor 901, and the instructions are executed by the at least one processor 901, so that the at least one processor 901 can execute the method for caching the message in the above embodiments.

The memory is connected to the processor by a bus which may include any number of interconnected buses and bridges. The bus connects one or more processors and various circuits of the memory together. The bus can further connect various other circuits, such as peripherals, voltage regulators, and power management circuits, which are well known in the art and will not be repeated herein. The bus interface provides an interface between the bus and the transceiver. The transceiver can be one element or a plurality of elements, such as a plurality of receivers and transmitters, providing a unit configured to communicate with various other devices on a transmission medium. The data processed by the processor is transmitted on a wireless medium via an antenna, and further, the antenna further receives the data and transmits the data to the processor.

The processor is configured for managing the bus and general processing, and can further provide various functions, such as timing, peripheral interfaces, voltage regulation, power management, and other control functions. The memory can be used to store data used by the processor when performing steps.

Another embodiment of the present application relates to a non-transitory computer-readable storage medium, which stores a computer program. When the computer program is executed by the processor, the above method embodiment is implemented.

That is, those skilled in the art can understand that all or part of the steps in the above method can be completed by instructing the hardware related to the program. The program is stored in a storage medium, and includes several instructions to enable a device (which can be a single-chip microcomputer, chip, and the like) or a processor to perform all or part of the steps of the method described in each embodiment of the present application. The aforementioned storage medium includes: the U disk, the mobile hard disk, the read-only memory (ROM), the RAM, the disk or the optical disk, and the like.

Those skilled in the art can understand that the above-mentioned embodiments are some embodiments for implementing the present application, and during actual applications, various modifications can be made in form and details without departing from the spirit and the scope of the present application.

What is claimed is:

1. A method for caching a message, comprising:

dividing a cache space into a cache array comprising N*N cache blocks, wherein N is a natural number greater than zero, and each cache block in the cache array has a same size;

selecting a cache block for storing the message according to a size of the message to be stored and a number of free addresses of each cache block; and storing the message in a free address of a selected cache block;

wherein the selecting the cache block for storing the message according to the size of the message to be stored and the number of free addresses of each cache block comprises:

determining a number L of cache blocks required to store the message according to the size of the message to be stored, wherein L is a natural number greater than zero;

determining L rows of cache blocks in the cache array as candidate cache rows; and in each candidate cache row, selecting a cache block as a target cache block according to a ranking result of the number of free addresses of each cache block;

wherein the storing the message in the free address of the selected cache block comprises:

storing the message in a free address of a selected target cache block.

2. The method for caching the message according to claim 1, wherein the determining L rows of cache blocks in the cache array as candidate cache rows comprises:

ranking the number of free addresses of each row of cache blocks in the cache array; and determining L rows of cache blocks in the cache array as the candidate cache rows according to the ranking result of the number of free addresses of each row of cache blocks.

3. The method for caching the message according to claim 2, wherein the ranking result of the number of free addresses of each row of cache blocks in the cache array and the ranking result of the number of free addresses of each cache block in the candidate cache row are obtained based on a comparison algorithm.

4. The method for caching the message according to claim 3, wherein:

a type of the cache block is a single-port random access memory (RAM) and the message to be stored comprises a first message and a second message;

before the selecting the cache block for storing the message according to the size of the message to be stored and the number of free addresses of each cache block, the method further comprises:

obtaining a priority of the first message and a priority of the second message; and the determining L rows of cache blocks in the cache array as candidate cache rows comprises:

for determining each candidate cache row, in response to that the priority of the first message is higher than the priority of the second message, selecting a row of cache blocks with a largest number of free addresses from the cache array as a candidate cache row of the first message, and selecting a row of cache blocks with a second largest number of free addresses from the cache array as a candidate cache row of the second message.

5. The method for caching the message according to claim 2, wherein selecting the cache block further comprises selecting the selected cache block comprises a first cache block and selecting at least one second cache block, and after the selecting the cache block for storing the message according to the size of the message to be stored and the number of free addresses of each cache block, the method further comprises:

writing an address of the at least one second cache block into the first cache block, wherein the first cache block is a target cache block selected from a first candidate cache row, and an address of the selected cache block is configured to indicate a storage location of the message.

6. The method for caching the message according to claim 1, wherein a type of the cache block is a single-port RAM, and before the selecting the cache block for storing the message according to the size of the message to be stored and the number of free addresses of each cache block, the method further comprises:

determining whether a dequeued message exists in the cache array;

in response to determining that the dequeued message exists in the cache array, removing a third cache block where the dequeued message is located from the cache array; and the selecting the cache block for storing the message according to the size of the message to be stored and the number of free addresses of each cache block comprises: selecting the cache block for storing the message from the cache array after the third cache block is removed from the cache array according to the size of the message to be stored and the number of free addresses of each cache block.

7. The method for caching the message according to claim 1, wherein a type of the cache block is a single-port RAM, and before the selecting the cache block for storing the message according to the size of the message to be stored and the number of free addresses of each cache block, the method further comprises:

determining whether a dequeued message exists in the cache array;

in response to determining that the dequeued message exists in the cache array, removing a third cache block where the dequeued message is located from the cache array; and the selecting the cache block for storing the message according to the size of the message to be stored and the number of free addresses of each cache block comprises: selecting the cache block for storing the message from the cache array after the third cache block is removed from the cache array according to the size of the message to be stored and the number of free addresses of each cache block.

8. The method for caching the message according to claim 2, wherein a type of the cache block is a single-port RAM, and before the selecting the cache block for storing the message according to the size of the message to be stored and the number of free addresses of each cache block, the method further comprises:

determining whether a dequeued message exists in the cache array;

in response to determining that the dequeued message exists in the cache array, removing a third cache block where the dequeued message is located from the cache array; and the selecting the cache block for storing the message according to the size of the message to be stored and the number of free addresses of each cache block comprises: selecting the cache block for storing the message from the cache array after the third cache block is removed from the cache array according to the size of the message to be stored and the number of free addresses of each cache block.

9. The method for caching the message according to claim 3, wherein a type of the cache block is a single-port RAM, and before the selecting the cache block for storing the message according to the size of the message to be stored and the number of free addresses of each cache block, the method further comprises:

determining whether a dequeued message exists in the cache array;

in response to determining that the dequeued message exists in the cache array, removing a third cache block where the dequeued message is located from the cache array; and the selecting the cache block for storing the message according to the size of the message to be stored and the number of free addresses of each cache block comprises: selecting the cache block for storing the message from the cache array after the third cache block is removed from the cache array according to the size of the message to be stored and the number of free addresses of each cache block.

10. The method for caching the message according to claim 4, wherein before the selecting the cache block for storing the message according to the size of the message to be stored and the number of free addresses of each cache block, the method further comprises:

determining whether a dequeued message exists in the cache array;

in response to determining that the dequeued message exists in the cache array, removing a third cache block where the dequeued message is located from the cache array; and the selecting the cache block for storing the message according to the size of the message to be stored and the number of free addresses of each cache block comprises: selecting the cache block for storing the message from the cache array after the third cache block is removed from the cache array according to the size of the message to be stored and the number of free addresses of each cache block.

11. The method for caching the message according to claim 5, wherein a type of the cache block is a single-port RAM, and before the selecting the cache block for storing the message according to the size of the message to be stored and the number of free addresses of each cache block, the method further comprises:

determining whether a dequeued message exists in the cache array;

in response to determining that the dequeued message exists in the cache array, removing a third cache block where the dequeued message is located from the cache array; and the selecting the cache block for storing the message according to the size of the message to be stored and the number of free addresses of each cache block comprises: selecting the cache block for storing the message from the cache array after the third cache block is removed from the cache array according to the size of the message to be stored and the number of free addresses of each cache block.

12. An electronic equipment, comprising:

at least one processor; and a memory communicating with the at least one processor;

wherein the memory stores an instruction executable by the at least one processor, and the instruction is executed by the at least one processor to make the at least one processor execute a method for caching a message comprising:

dividing a cache space into a cache array comprising N*N cache blocks, wherein N is a natural number greater than zero, and each cache block in the cache array has a same size;

selecting a cache block for storing the message according to a size of the message to be stored and a number of free addresses of each cache block; and storing the message in a free address of a selected cache block;

wherein the selecting the cache block for storing the message according to the size of the message to be stored and the number of free addresses of each cache block comprises:

determining a number L of cache blocks required to store the message according to the size of the message to be stored, wherein L is a natural number greater than zero;

determining L rows of cache blocks in the cache array as candidate cache rows; and in each candidate cache row, selecting a cache block as a target cache block according to a ranking result of the number of free addresses of each cache block;

wherein the storing the message in the free address of the selected cache block comprises:

storing the message in a free address of a selected target cache block.

13. A non-transitory computer-readable storage medium, storing a computer program, wherein when the computer program is executed by a processor, a method for caching a message is implemented, and the method for caching the message comprises:

dividing a cache space into a cache array comprising N*N cache blocks, wherein N is a natural number greater than zero, and each cache block in the cache array has a same size;

selecting a cache block for storing the message according to a size of the message to be stored and a number of free addresses of each cache block; and storing the message in a free address of a selected cache block;

wherein the selecting the cache block for storing the message according to the size of the message to be stored and the number of free addresses of each cache block comprises:

determining a number L of cache blocks required to store the message according to the size of the message to be stored, wherein L is a natural number greater than zero;

determining L rows of cache blocks in the cache array as candidate cache rows; and in each candidate cache row, selecting a cache block as a target cache block according to a ranking result of the number of free addresses of each cache block;

wherein the storing the message in the free address of the selected cache block comprises:

storing the message in a free address of a selected target cache block.

* * * * *